(12) United States Patent
Oh et al.

(10) Patent No.: US 9,515,314 B2
(45) Date of Patent: Dec. 6, 2016

(54) CATHODE ACTIVE MATERIAL COMPRISING LITHIUM MANGANESE-BASED OXIDE AND NON-AQUEOUS ELECTROLYTE SECONDARY BATTERY BASED UPON THE SAME

(71) Applicant: LG CHEM, LTD., Seoul (KR)

(72) Inventors: Song-Taek Oh, Daejeon (KR); Sang Uck Lee, Daejeon (KR); Se Hui Sohn, Daejeon (KR); GeunChang Chung, Daejeon (KR); SinKyu Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 409 days.

(21) Appl. No.: 13/796,098

(22) Filed: Mar. 12, 2013

(65) Prior Publication Data

US 2013/0189578 A1    Jul. 25, 2013

Related U.S. Application Data

(63) Continuation of application No. PCT/KR2011/006900, filed on Sep. 19, 2011.

(30) Foreign Application Priority Data

Sep. 20, 2010   (KR) .................. 10-2010-0092245

(51) Int. Cl.
   *H01M 4/133* (2010.01)
   *H01M 4/131* (2010.01)
   (Continued)

(52) U.S. Cl.
   CPC .......... *H01M 4/133* (2013.01); *B60L 11/1879* (2013.01); *H01M 4/131* (2013.01);
   (Continued)

(58) Field of Classification Search
   CPC ....................... H01M 4/133; H01M 4/625
   See application file for complete search history.

(56) References Cited

U.S. PATENT DOCUMENTS

| 5,789,114 A | 8/1998 | Adachi et al. |
| 2003/0068555 A1 | 4/2003 | Naruoka |

(Continued)

FOREIGN PATENT DOCUMENTS

| JP | 9-92265 A | 4/1997 |
| JP | 2001-2421 A | 1/2001 |

(Continued)

OTHER PUBLICATIONS

International Search Report issued in PCT/KR2011/006900, mailed on Apr. 4, 2012.

(Continued)

*Primary Examiner* — Ula C Ruddock
*Assistant Examiner* — Frank Chernow
(74) *Attorney, Agent, or Firm* — Birch, Stewart, Kolasch & Birch, LLP

(57) ABSTRACT

Disclosed is a cathode active material including a lithium manganese-based oxide. The lithium manganese-based oxide has a spinel structure represented by Formula 1 below and high lithium ion diffusivity since (440) planes are predominantly formed in a crystal structure thereof.

$$Li_{1+x}M_yMn_{2-x-y}O_{4-z}Q_z \quad (1)$$

In Formula 1, 0≤x≤0.3, 0≤y≤1, and 0≤z≤1, M includes at least one element selected from the group consisting of Al, Mg, Ni, Co, Fe, Cr, V, Ti, Cu, B, Ca, Zn, Zr, Nb, Mo, Sr, Sb, W, Ti, and Bi, and Q includes at least one element selected from the group consisting of N, F, S, and Cl.

12 Claims, 7 Drawing Sheets

(51) Int. Cl.
  *H01M 4/1391* (2010.01)
  *H01M 4/505* (2010.01)
  *H01M 4/62* (2006.01)
  *H01M 4/66* (2006.01)
  *B60L 11/18* (2006.01)

(52) U.S. Cl.
  CPC ........... *H01M4/1391* (2013.01); *H01M 4/505* (2013.01); *H01M 4/625* (2013.01); *H01M 4/66* (2013.01); *B60L 2240/545* (2013.01); *Y02E 60/122* (2013.01); *Y02T 10/7005* (2013.01); *Y02T 10/705* (2013.01); *Y02T 10/7011* (2013.01)

(56) References Cited

U.S. PATENT DOCUMENTS

| | | |
|---|---|---|
| 2010/0140554 A1 | 6/2010 | Oki et al. |
| 2010/0207059 A1 | 8/2010 | Uegami et al. |
| 2010/0230641 A1 | 9/2010 | Oki et al. |
| 2010/0261061 A1 | 10/2010 | Yuasa et al. |
| 2010/0288969 A1 | 11/2010 | Koga et al. |
| 2013/0183587 A1 | 7/2013 | Uegami et al. |

FOREIGN PATENT DOCUMENTS

| | | |
|---|---|---|
| JP | 2001-328813 A | 11/2001 |
| JP | 2002-319390 A | 10/2002 |
| JP | 2003-142101 A | 5/2003 |
| JP | 2005-251713 A | 9/2005 |
| JP | 2006-66341 A | 3/2006 |
| JP | 2006-252940 A | 9/2006 |
| JP | 2007-112709 A | 5/2007 |
| JP | 2010-137996 A | 6/2010 |
| WO | WO 2008/126364 A1 | 10/2008 |

OTHER PUBLICATIONS

Kang, S.H. et al, "Effect of Ball-Milling on 3-V Capacity of Lithium-Manganese Oxospinel Cathodes," Chem. Mater., 2001, vol. 13, pp. 1758-1764.

— 1 —

CATHODE ACTIVE MATERIAL COMPRISING LITHIUM MANGANESE-BASED OXIDE AND NON-AQUEOUS ELECTROLYTE SECONDARY BATTERY BASED UPON THE SAME

CROSS REFERENCE TO RELATED APPLICATIONS

This application is a Continuation of PCT International Application No. PCT/KR2011/006900 filed on Sep. 19, 2011, which claims priority under 35 U.S.C. §119(a) to Patent Application No. 10-2010-0092245 filed in the Republic of Korea on Sep. 20, 2010, all of which are hereby expressly incorporated by reference into the present application.

TECHNICAL FIELD

The present invention relates to a cathode active material including a lithium manganese-based oxide and a non-aqueous electrolyte secondary battery including the cathode active material. More specifically, the present invention relates to a cathode active material including a lithium manganese-based oxide with a specific spinel structure having a crystal structure in which (440) planes are predominantly formed to provide excellent capacity and long cycle lifespan, resulting in improved lithium ion diffusivity and a non-aqueous electrolyte secondary battery including the cathode active material.

BACKGROUND ART

Recently, increased concern over environmental issues has brought about a great deal of research associated with electric vehicles (EVs) and hybrid electric vehicles (HEVs) as substitutes for vehicles using fossil fuels, such as gasoline vehicles and diesel vehicles, which are a major cause of air pollution. Although nickel metal hydride-based secondary batteries have mostly been used as power sources of such EVs, HEVs, and the like, a great deal of studies into use of lithium secondary batteries having high energy density, high discharge voltage, long cycle lifespan, and low self discharge rate is now extensively implemented and some thereof are commercially available.

In conventional lithium secondary batteries, a carbonaceous material is usually used as an anode active material and use of lithium metal, sulfur compounds, and the like is also considered. In addition, lithium-containing cobalt oxide ($LiCoO_2$) is commonly used as a cathode active material, and lithium-containing manganese oxides such as $LiMnO_2$ having a layered structure and $LiMn_2O_4$ having a spinel structure and lithium-containing nickel oxides such as $LiNiO_2$ are also used.

Among these cathode active materials, $LiCoO_2$ with long cycle lifespan and high charge-discharge efficiency is the most commonly used material. However, $LiCoO_2$ entails problems such as low structural stability and high costs for cobalt as a raw material due to limited availability of cobalt, in turn reducing price competitiveness. Accordingly, there are restrictions on use of $LiCoO_2$ in large quantities in EV applications.

Meanwhile, although $LiNiO_2$-based cathode active materials are relatively cheap and embody high discharge capacity, they exhibit rapid phase transition in a crystal structure depending upon capacity variation accompanied by charge-discharge cycle and, when exposed to air and/or moisture, encounter sharp reduction in safety.

Lithium manganese oxides such as $LiMnO_2$ and $LiMn_2O_4$ have merits of excellent thermal stability and low price but entail disadvantages such as low capacity, short cycle lifespan, and poor properties at high temperature.

Among these, $LiMn_2O_4$ with a spinel structure shows relatively uniform potential in the 4V region (3.7 to 4.3V) and the 3V region (2.7 to 3.1V). However, it is known that cycle lifespan and storage properties of the above oxide are significantly deteriorated in the 3V region, thus causing difficulty in use thereof. This is because the above oxide is present in a single cubic phase in the 4V region due to phase transition based on Jahn-Teller distortion and is converted into a complex phase including two phases of the cubic phase and the tetragonal phase in the 3V region, and manganese is eluted into an electrolyte.

In addition, if spinel $LiMn_2O_4$ is synthesized using a general method such as solid state reaction, (111) planes with a lower surface energy are predominantly formed. The (111) planes have relatively low lithium ion diffusivity in comparison with other planes.

For such reasons, when a spinel lithium manganese oxide is utilized in the 3V region, real capacity of the oxide is generally lower than a theoretical capacity of the same and C-rate properties are relatively low.

Therefore, it is known that utilization of spinel lithium manganese oxides in the 3V region becomes very difficult. Some studies have reported that cycle lifespan may be increased in the 3V region by formation of a tetragonal phase and S-doping. However, such improvement is insignificant or exact reasons thereof have not been found yet.

Regarding utilization of lithium manganese oxides in the 3V region, some studies have reported a technique of increasing cycle lifespan in the 3V region by mixing a spinel lithium manganese oxide with carbon through milling. However, the present inventors have found that this technique cannot attain desired improvement in charge-discharge characteristics in the 3V region.

Therefore, there is a need to develop a technique of simply manufacturing a spinel lithium manganese oxide having high lithium ion diffusivity, high capacity, and long lifespan in the 3V region.

DISCLOSURE

Technical Problem

Therefore, the present invention has been made to solve the above and other technical problems that have yet to be resolved.

As a result of a variety of extensive and intensive studies and experiments to solve the problems as described above, the present inventors have found that (440) planes are predominantly formed in a crystal structure of a cathode active material, which is a complex of a lithium manganese-based oxide with a specific spinel structure, a first carbonaceous material, and a second carbonaceous material with a smaller particle diameter than that of the first carbonaceous material, when the cathode active material is milled, so that high capacity and long lifespan may be obtained in the 3V region. The present invention has been completed, based on this discovery.

Technical Solution

In accordance with one aspect of the present invention, provided is a cathode active material including a lithium manganese-based oxide with a spinel structure represented by Formula 1 below. In a crystal structure of the lithium manganese-based oxide, (440) planes are predominantly formed to provide excellent lithium ion diffusivity.

$$Li_{1+x}M_yMn_{2-x-y}O_{4-z}Q_z \qquad (1)$$

In Formula 1, 0≤x≤0.3, 0≤y≤1, and 0≤z≤1, M includes at least one element selected from the group consisting of Al, Mg, Ni, Co, Fe, Cr, V, Ti, Cu, B, Ca, Zn, Zr, Nb, Mo, Sr, Sb, W, Ti, and Bi, and Q includes at least one element selected from the group consisting of N, F, S, and Cl.

In general, in a crystal structure, planes are enclosed in parentheses "( )". In this regard, a reciprocal of a point of the plane contacting the x-, y-, and z-axes is indicated in parentheses "( )". That is, a contact point of a plane perpendicular to the x-axis with each axis is (1∞ ∞), and a reciprocal thereof is 100. Thus, for example, a (440) plane is perpendicular to the x and y axes and contact points with each of the axes are (1/4, 1/4∞).

Meanwhile, in a crystal structure, crystal directions are indicated using brackets "[ ]". In this regard, directions corresponding to x, y, and z axes (or a, b, and c directions) are represented by [100], [010], and [001] directions. That is, a plane perpendicular to the [100] direction is a (100) plane.

Lithium ion diffusivity plays an important role in C-rate and capacity properties of lithium secondary batteries. In a lithium secondary battery, as the C-rate properties are improved, charge-discharge time may be reduced, and as the capacity properties are improved, utilization of lithium ions in a cathode active material may be improved.

The present inventors have found that the (440) planes of the lithium manganese-based oxide represented by Formula 1 play an important role in lithium ion diffusivity. That is, in such a lithium manganese-based oxide, a crystal structure in which the (440) planes are predominant in comparison with the (111) planes, which exhibit a main peak, has relatively high lithium ion diffusivity. Such relatively high lithium ion diffusivity was confirmed not only in a cubic crystal structure but also a tetragonal crystal structure.

According to an embodiment, an intensity ratio of (440) plane/(111) plane ((440)/(111)) of the material according to the present invention measured by Rietveld refinement may be 0.24 or more, preferably 0.25 or more, more preferably in the range of 0.25 to 0.50.

In the synthesis of conventional spinel structures, the (111) planes with a lower surface energy are more predominantly formed. However, in the material according to the present invention, the (440) planes with a higher surface energy are predominantly formed in comparison with conventional materials.

The cathode active material according to the present invention may include a complex of a lithium manganese-based oxide with a spinel structure represented by Formula 1, a first carbonaceous material with a relatively large particle diameter, and a second carbonaceous material with a relatively small particle diameter.

The complex may be synthesized using various methods. For example, the complex may be prepared by adding the first carbonaceous material and the second carbonaceous material to secondary particles of the lithium manganese-based oxide with a spinel structure and forming primary particles.

The primary particles may be obtained by any method used to pulverize the secondary particles. For example, high energy milling such as spex milling and planetary milling, wet milling, or the like may be used, but the method is not limited thereto.

If high energy milling is applied, the complex exhibits peak properties of graphite at 33° to 34° in XRD analysis using an Fe Ka target. This may be confirmed in FIG. 2.

Since the (440) planes providing high lithium ion diffusivity are predominant in the cathode active material according to the present invention, a secondary battery with excellent C-rate and capacity properties may be prepared using the cathode active material.

In addition, the carbonaceous material used herein may improve conductivity of the spinel lithium manganese oxide.

The lithium manganese-based oxide according to the present invention may exhibit core-shell phase transition by which phase transition of the crystal structure occurs from a cubic structure to a tetragonal structure in a direction from the surface of particles to the center of the particles during discharging to the 3V region. The particles may be primary particles or secondary particles obtained by aggregation of a plurality of primary particles.

In an embodiment, on the assumption that the secondary particles of the lithium manganese-based oxide are in spherical forms, the first carbonaceous material may have an average particle diameter of 0.3 μm to 30 μm and may be disposed on the external surface of the secondary particles of the lithium manganese-based oxide. In addition, some of the first carbonaceous material may break to move to domains of the secondary particles.

On the other hand, the second carbonaceous material may have an average particle diameter of 10 nm to 500 nm which is smaller than that of the first carbonaceous material and may be disposed between primary particles at the outer circumferential area of the secondary particles. The second carbonaceous material may be disposed between primary particles at a position between 0.3 r to 1 r from the center of the secondary particle with respect to the radius (r) of the secondary particle. Preferably, the second carbonaceous material may be disposed between the primary particles at a position between 0.5 r to 1 r from the center of the secondary particle. In other words, a core-shell structure may be formed.

Although high conductivity may be obtained when the second carbonaceous material is uniformly dispersed in the secondary particles, this structure cannot be easily synthesized. As the content of the second carbonaceous material increases in order to improve uniformity thereof, the content of the spinel lithium manganese oxide involved in charge and discharge is reduced, resulting in decrease in energy density. Thus, since the core-shell phase transition occurs, the structure in which the second carbonaceous material is disposed between the primary particles at the outer circumferential area of the secondary particles is efficient and preferable.

If the content of the carbonaceous materials is too small, the effect of adding the carbonaceous materials is insignificant. On the other hand, if the content of the carbonaceous materials is too large, the content of the active material is relatively low, resulting in reduced capacity. Thus, the content of the first carbonaceous material may be in the range of 1 to 15% by weight based on the total weight of the cathode active material, and the content of the second carbonaceous material may be in the range of 1 to 15% by weight based on the total weight of the cathode active material. The total content of the first carbonaceous material and the second carbonaceous material may be in the range of 2 to 20% by weight based on the total weight of the cathode active material. Preferably, the content of the first carbonaceous material may be in the range of 1 to 10% by weight, the content of the second carbonaceous material may be in the range of 1 to 10% by weight, and the total content of the first carbonaceous material and the second carbonaceous material may be in the range of 2 to 15% by weight.

The carbonaceous material is not particularly limited so long as it has excellent electrical conductivity and does not cause side reaction in the inner environment of the lithium secondary battery and may be any carbon-based material with high electrical conductivity. Examples of the highly conductive first carbonaceous material include natural graphite, artificial graphite, and the like with a particle diameter of 0.3 µm to 30 µm. Examples of the second carbonaceous material include Denka black, channel black, furnace black, Ketjen black, carbon black, and the like with an average particle of 10 to 500 nm which is smaller than that of the first carbonaceous material. If required, a polymer with high conductivity may also be used.

The cathode active material according to the present invention may further include other active materials in addition to the spinel lithium manganese-based oxide. In this case, the spinel lithium manganese-based oxide may be contained in an amount of 30 to 100%, preferably 50 to 100%, based on the total weight of the cathode active material. Here, other active materials may include a variety of active materials known in the art such as lithium cobalt oxide, lithium nickel oxide, lithium cobalt-manganese oxide, lithium nickel-manganese oxide, lithium cobalt-nickel oxide, lithium cobalt-manganese-nickel oxide, and oxides having other elements substituted or doped thereon.

The present invention also provides a cathode material including the foregoing cathode active material.

The cathode material may optionally include a binder, a filler, and the like, in addition to the cathode active material.

The binder assists in combination of an active material with a conductive material and bonding to a current collector and is normally added in an amount of 1 to 30 wt % based on the total weight of a mixture containing the cathode active material. Examples of the binder include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorinated rubber, and various copolymers.

The filler that is a supplementary ingredient to inhibit electrode expansion is optionally used and is not particularly restricted so long as it includes fibrous materials without causing chemical modification of the battery. The filler may include, for example, olefin polymers such as polyethylene and polypropylene and fibrous materials such as glass fiber and carbon fiber.

According to the present invention, a conductive material need not be added to the cathode material since the first carbonaceous material and the second carbonaceous material contained in the cathode active material provide conductivity. However, addition of the conductive material is also within the scope of the present invention.

The present invention also provides a cathode for a secondary battery, which includes the foregoing cathode material applied to a current collector.

The cathode for a secondary battery may be fabricated by, for example, mixing the cathode material in a solvent such as NMP to prepare a slurry, applying the slurry to a cathode current collector and drying and rolling the coated current collector.

The cathode current collector described above is generally fabricated to have a thickness of 3 to 500 µm. Such cathode current collector is not particularly restricted so long as it has high conductivity without causing chemical modification of the battery. For example, the cathode current collector may be fabricated using stainless steel, aluminum, nickel, titanium, calcined carbon, or stainless steel or aluminum surface-treated with carbon, nickel, titanium, silver, and the like. The current collector may be processed to have fine irregularities on the surface thereof, so as to enhance adhesion to the cathode active material. In addition, the current collector may have various forms including films, sheets, foils, nets, porous structures, foams, non-woven fabrics, etc.

The present invention also provides a lithium secondary battery including the cathode described above, an anode, a separator, and a non-aqueous electrolyte containing lithium salts. The lithium secondary battery according to the present invention exhibits excellent capacity and long cycle lifespan in the range of 2.5 to 4.5V, which is the 3V region, as well as in the 4V region.

The anode used herein is fabricated by, for example, applying an anode material containing an anode active material to an anode current collector, and then drying the coated collector. In this case, the anode material may optionally include the foregoing components.

The anode material may include a conductive material. In this regard, the conductive material may be added in an amount of 1 to 30 wt % based on the total weight of a mixture containing the anode active material. Such conductive material is not particularly restricted so long as it has conductive properties without causing chemical modification of the battery. The conductive material may include, for example: graphite such as natural graphite or artificial graphite; carbon black such as acetylene black, Ketjen black, channel black, furnace black, lamp black, and thermal black; conductive fibers such as carbon fiber or metal fiber; metal powder such as carbon fluoride powder, aluminum powder, and nickel powder; conductive whiskers such as zinc oxide and potassium titanate; conductive metal oxides such as titanium oxide; and conductive substances such as polyphenylene derivatives.

The anode current collector is generally fabricated to have a thickness of 3 to 500 µm. Such anode current collector is not particularly restricted so long as it has favorable conductivity without causing chemical modification of the battery. For example, the anode current collector may be fabricated using copper, stainless steel, aluminum, nickel, titanium, calcined carbon, copper or stainless steel surface-treated with carbon, nickel, titanium, or silver, aluminum-cadmium alloy, and the like. Similar to the cathode current collector, the anode current collector may be processed to have fine irregularities on the surface thereof, so as to enhance adhesion to the anode active material. In addition, the anode current collector may have various forms including films, sheets, foils, nets, porous structures, foams, non-woven fabrics, and the like.

The separator used herein is interposed between the cathode and the anode and may be formed using a thin insulation film having high ion permeability and excellent mechanical strength. The separator typically has a pore diameter of 0.01 to 10 µm and a thickness of 5 to 300 µm. As the separator, a sheet or non-woven fabric made of olefin polymers such as polypropylene and polyethylene or glass fibers which have chemical resistance and hydrophobicity may be used. When a solid electrolyte such as polymer is employed as the electrolyte, the solid electrolyte may also serve as the separator.

The non-aqueous electrolyte containing lithium salt used herein includes an electrolyte and a lithium salt. The electrolyte may be a non-aqueous organic solvent, an organic solid electrolyte, an inorganic solid electrolyte, or the like.

The non-aqueous organic solvent may be an aprotic organic solvent such as N-methyl-2-pyrrolidone, propylene carbonate, ethylene carbonate, butylene carbonate, dimethyl carbonate, diethyl carbonate, γ-butyrolactone, 1,2-dimethoxy ethane, tetrahydroxy franc, 2-methyl tetrahydrofuran, dimethyl sulfoxide, 1,3-dioxolane, formamide, dimethyl formamide, dioxolane, acetonitrile, nitromethane, methyl formate, methyl acetate, phosphoric triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric ester polymers, poly agitation lysine, polyester sulfide, polyvinyl alcohol, polyvinylidene fluoride, and polymers containing ionic dissociation groups.

Examples of the inorganic solid electrolyte include nitrides, halides, and sulfates of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$NiOH$, and $Li_3PO_4$—$Li_2S$—$SiS_2$.

The lithium salt used herein is a material readily dissolved in the non-aqueous electrolyte and may include, for example, $LiCl$, $LiBr$, $LiI$, $LiClO_4$, $LiBF_4$, $LiPF_6$, $LiCF_3SO_3$, $LiCF_3CO_2$, $LiAsF_6$, $LiSbF_6$, $LiAlCl_4$, $(CF_3SO_2)_2NLi$, chloroborane lithium, low aliphatic carboxylic lithium, lithium tetraphenyl borate, and imides.

In addition, in order to improve charge-discharge properties and flame retardancy, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, may also be added to the non-aqueous electrolyte. If necessary, in order to impart non-flammability, the non-aqueous electrolyte may further include halogen-containing solvents such as carbon tetrachloride and ethylene trifluoride. The non-aqueous electrolyte may further include carbon dioxide gas, fluoro-ethylene carbonate (FEC), or propene sultone (PRS) in order to improve high-temperature storage characteristics.

The secondary battery fabricated according to the present invention may be employed in a battery cell that is a power source of a small device and, preferably used as a unit cell for medium and large-scale battery modules having a number of battery cells.

Preferred examples of medium and large-scale devices include electric vehicles, hybrid electric vehicles, plug-in hybrid electric vehicles, power storage systems, and the like, without being particularly limited thereto.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, the present invention will be described in more detail with reference to the following examples. These examples are provided only for illustration of the present invention and should not be construed as limiting the scope and spirit of the present invention.

Example 1

$Li_2CO_3$ and $MnO_2$ were mixed at an equivalent ratio, and the mixture was calcined at 800° C. to prepare a lithium manganese-based oxide. Then, 80% by weight of the lithium manganese-based oxide, 7% by weight of graphite, and 7% by weight of Denka black were mixed by spex-milling to prepare a complex. The complex was mixed with 6% by weight of polyvinylidene fluoride (PVDF) in N-methyl-pyrrolidone (NMP), as a solvent, to prepare an active material slurry.

Comparative Example 1

An active material slurry was prepared in the same manner as in Example 1, except that spex milling was not performed.

Comparative Example 2

$Li_2CO_3$ and $MnO_2$ were mixed at an equivalent ratio, and the mixture was calcined at 800° C. to prepare a lithium manganese-based oxide. Then, the lithium manganese-based oxide was spex-milled, and 80% by weight of the spex-milled lithium manganese-based oxide, 7% by weight of graphite, 7% by weight of Denka black, and 6% by weight of PVDF were mixed in NMP, as a solvent, to prepare an active material slurry.

Comparative Example 3

$Li_2CO_3$ and $MnO_2$ were mixed at an equivalent ratio, and the mixture was calcined at 800° C. to prepare a lithium manganese-based oxide. Then, 80% by weight of the lithium manganese-based oxide, 14% by weight of dispersed Denka black, and 6% by weight of PVDF were mixed in NMP, as a solvent, to prepare an active material slurry.

Experimental Example 1

The active materials respectively prepared in Example 1 and Comparative Examples 1 to 3 were analyzed using X-ray diffraction (Bruker AXS D4 Endeavor XRD) by Fe Kα radiation (wavelength: 1.94) by a LynxEye position sensitive detector and measured by Rietveld refinement. The results are shown in FIGS. 1 and 2 and Table 1 below.

TABLE 1

| | Intensity ratio ((440)/(111)) |
|---|---|
| Example | 0.285 |
| Comparative Example 1 | 0.227 |
| Comparative Example 2 | 0.233 |
| Comparative Example 3 | 0.221 |

Figure 1:
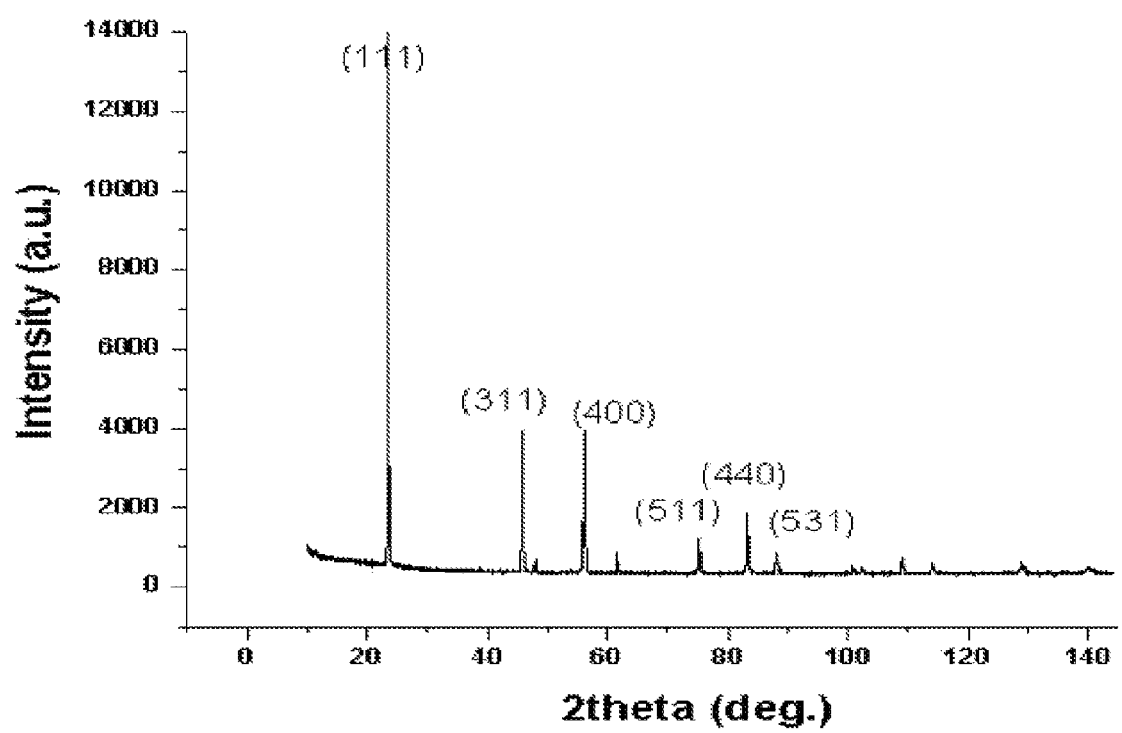
FIG. 1 is a graph illustrating an XRD pattern of an active material according to Comparative Example 1 not treated by spex milling obtained using an Fe Kα target.
Figure 2:
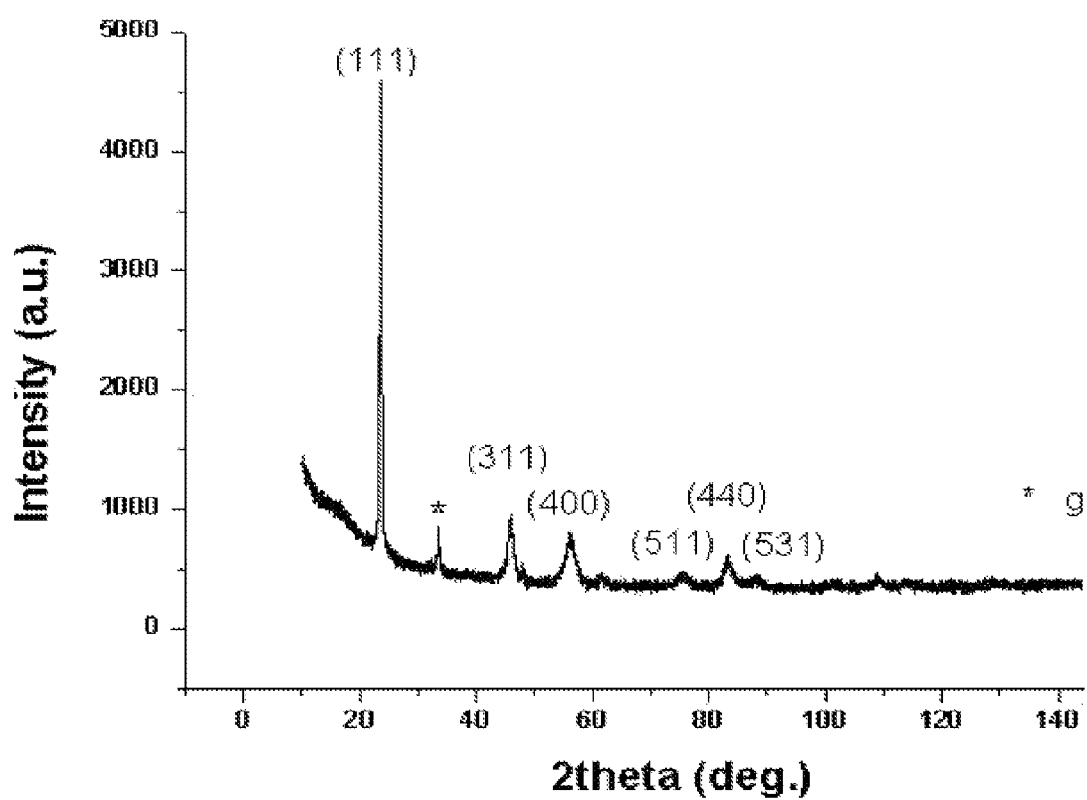
FIG. 2 is a graph illustrating an XRD pattern of an active material according to Example 1 treated by spex milling obtained using an Fe Kα target.
Figure 3:
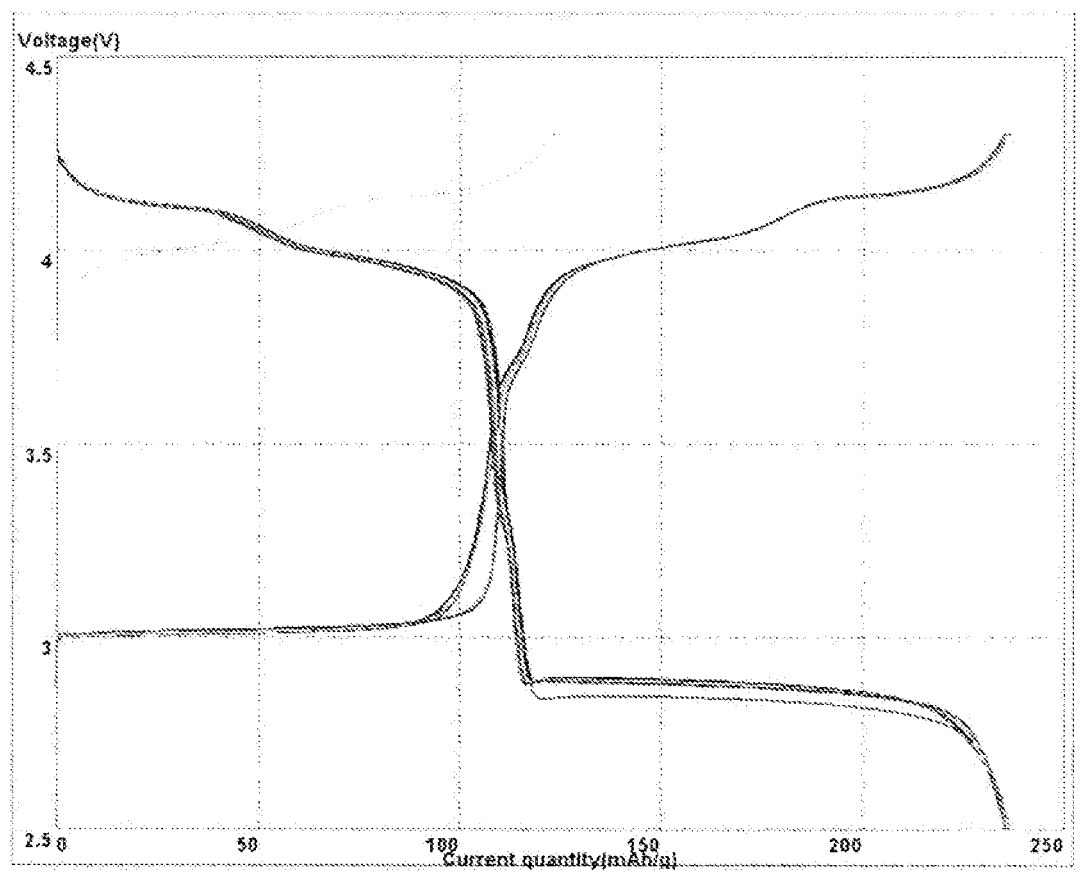
FIG. 3 is a graph illustrating a voltage-current profile of a battery including an active material prepared in Example 1 depending upon number of cycles.
Figure 4:
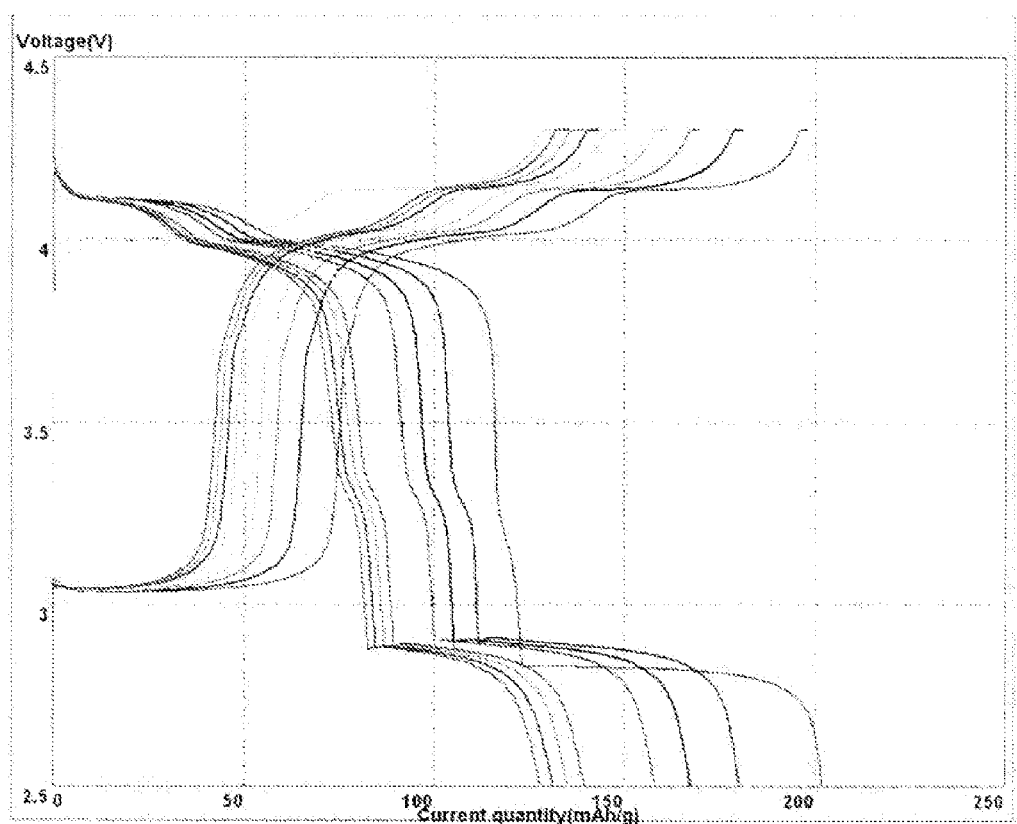
FIG. 4 is a graph illustrating a voltage-current profile of a battery including an active material prepared in Comparative Example 1 depending upon the number of cycles.
Figure 5:
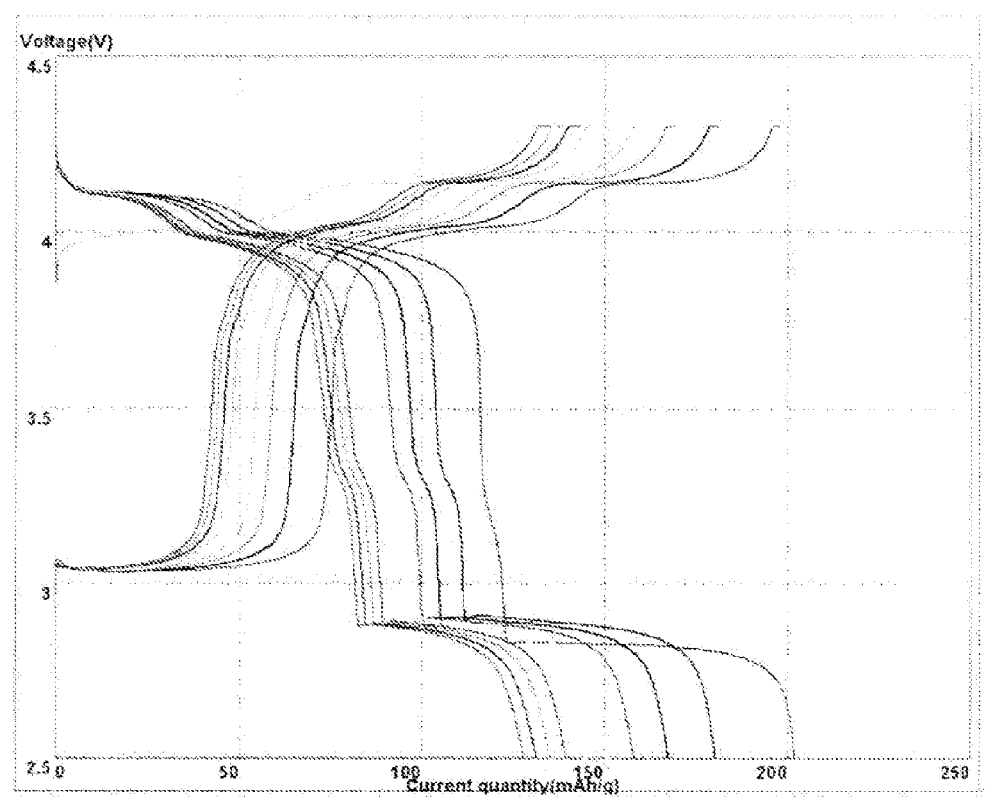
FIG. 5 is a graph illustrating a voltage-current profile of a battery including an active material prepared in Comparative Example 2 depending upon the number of cycles.
Figure 6:
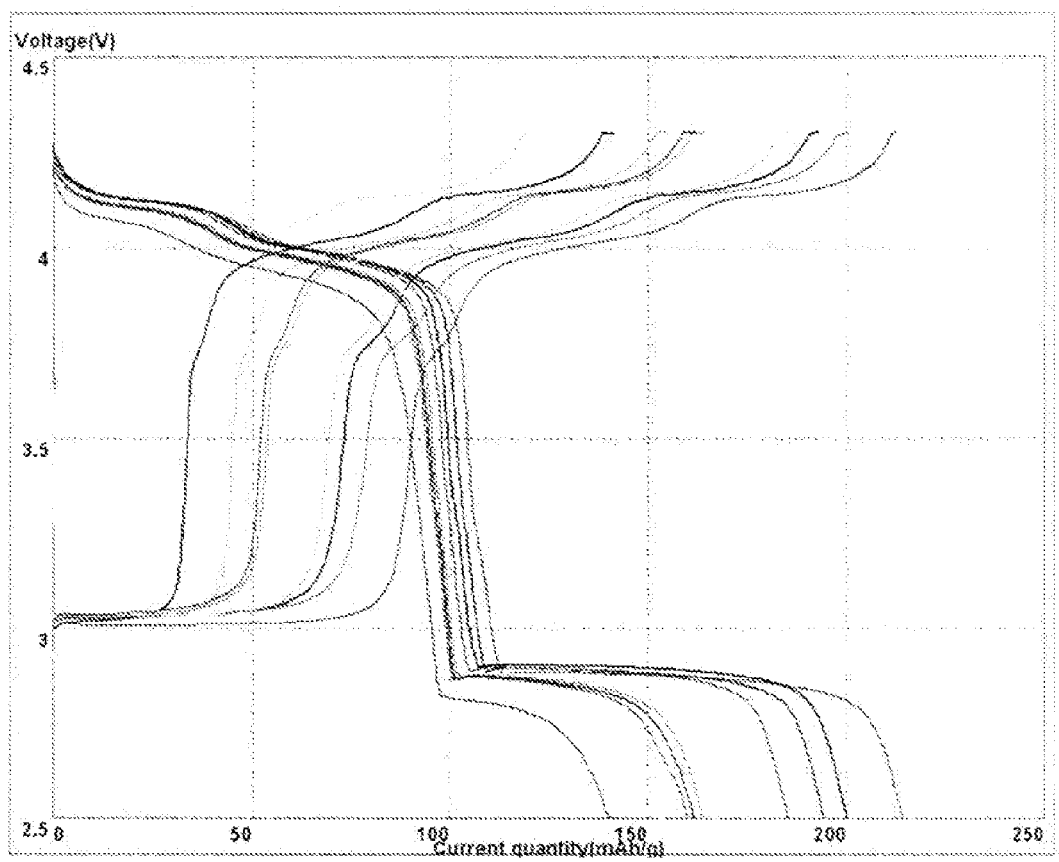
FIG. 6 is a graph illustrating a voltage-current profile of a battery including an active material prepared in Comparative Example 3 depending upon the number of cycles.

Referring to Table 1 and FIG. 1. an intensity ratio of (440) plane/(111) plane ((440)/(111)) of the active material prepared in Comparative Example 1 measured by Rietveld refinement was 0227.

On the other hand, referring to Table 1 and FIG. 2, an intensity ratio of (440) plane/(111) plane ((440)/(111)) of the active material prepared in Example 1 measured by Rietveld refinement was 0.285. In addition, according to the XRD analysis using an Fe Kα target, the active material prepared in Example 1 had peak properties of graphite at 33° to 34° and the (440) planes were predominantly formed in the active material.

As a result, according to the results of Table 1 and FIG. 1, the intensity ratio of (440) plane/(111) plane ((440)/(111)) of the active material of Example 1 measured by Rietveld refinement was greater than those of the active materials prepared in Comparative Examples 1 to 3. Thus, it can be seen that the (440) planes were predominantly formed in the crystal structure of the active material prepared in Example 1.

Experimental Example 2

Coin type half cells of lithium secondary batteries each including a cathode including each of the cathode active material slurries respectively prepared in Example 1 and Comparative Examples 1 to 3, a lithium anode, a porous polyethylene separator, and a lithium salt-containing non-aqueous electrolyte were fabricated.

The fabricated half cells were subjected to repeated charge/discharge at 0.1 C in a range of 2.5 to 4.3 V to determine variation in capacities depending upon number of cycles. The results are shown in FIG. 7.

Figure 7:
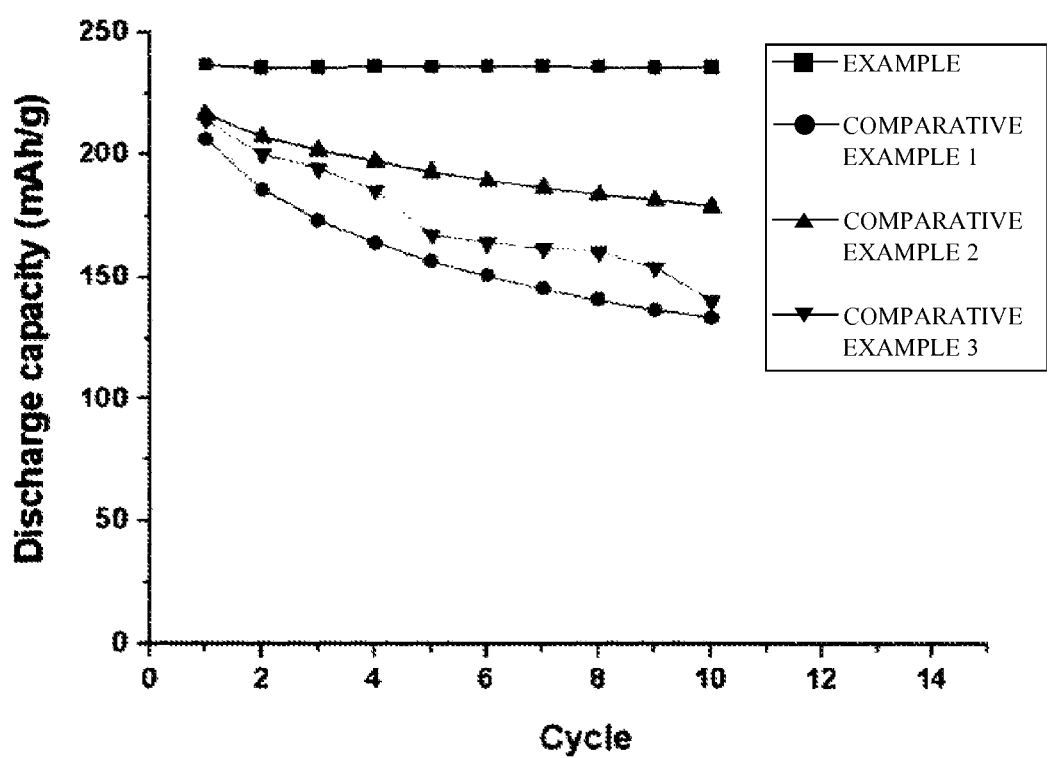
FIG. 7 is a graph illustrating discharge capacity of batteries depending upon number of cycles according to Experimental Example 1.

Referring to FIG. 7, discharge capacity of the battery fabricated using the active material prepared in Example 1 was not reduced as charge and discharge were repeated. However, the batteries fabricated using the active materials prepared in Comparative Examples 1 to 3 exhibited lower initial capacity than that of the battery fabricated using the active material prepared in Example 1 and exhibited significant reduction in discharge capacity as charge and discharge were repeated.

INDUSTRIAL APPLICABILITY

As apparent from the foregoing description, the cathode active material according to the present invention exhibits high capacity and long lifespan, and a lithium secondary battery with excellent performance may be fabricated using the cathode active material.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cathode active material comprising a complex comprising a lithium manganese oxide with a spinel structure represented by Formula 1 below,
   a first carbonaceous material having a particle diameter of 0.3 μm to 30 μm, and a second carbonaceous material having a particle diameter of 10 nm to 500 nm in a range smaller than the particle diameter of the first carbonaceous material,
   wherein an intensity ratio of plane-(440)/plane (111) ((440)/(111)) measured by Rietveld refinement was 0.24 or greater, and
   wherein the complex is formed by milling the spinel lithium manganese oxide with the first carbonaceous material and the second carbonaceous material:

$$LiMn_2O_4 \quad (1)$$

wherein the lithium manganese oxide has a structure of secondary particles formed by aggregation of a plurality of primary particles, and
wherein the second carbonaceous material is disposed between primary particles of the lithium manganese oxide, and the first carbonaceous material is disposed at the external surface of the secondary particles of the lithium manganese oxide.

2. The cathode active material according to claim 1, wherein an intensity ratio of plane (440)/plane (111) ((440)/(111)) measured by Rietveld refinement was 0.25 or greater.

3. The cathode active material according to claim 1, wherein the second carbonaceous material is disposed between primary particles at a position between 0.3r to 1r from the center of a secondary particle with respect to the radius (r) of the secondary particle.

4. The cathode active material according to claim 1, wherein the content of the first carbonaceous material is in the range of 1 to 15 wt %, the content of the second carbonaceous material is in the range of 1 to 15 wt %, and a total weight of the first and second carbonaceous materials is in the range of 2 to 20 wt %, based on the total weight of the cathode active material, respectively.

5. The cathode active material according to claim 1, wherein the complex exhibits peak properties of graphite at 33° to 34° according to the XRD analysis using an Fe Kα target.

6. The cathode active material according to claim 1, wherein the first carbonaceous material comprises at least one selected from the group consisting of natural graphite and artificial graphite, and the second carbonaceous material comprises carbon black.

7. A cathode material comprising a cathode active material according to claim 1.

8. A cathode for a secondary battery prepared by coating the cathode material according to claim 7 on a current collector.

9. A lithium secondary battery comprising the cathode for a secondary battery according to claim 8.

10. The lithium secondary battery according to claim 9, wherein the lithium secondary battery is used as a unit cell for battery modules that are power sources for devices.

11. The lithium secondary battery according to claim 10, wherein the medium and large-scale devices comprise electric vehicles, hybrid electric vehicles, plug-in hybrid electric vehicles, or power storage systems.

12. The cathode active material according to claim 1, wherein the milling is spex milling.

* * * * *